United States Patent
Matsuda et al.

(10) Patent No.: US 7,545,993 B2
(45) Date of Patent: Jun. 9, 2009

(54) IMAGE PROCESSING DEVICE AND IMAGE PROCESSING METHOD

(75) Inventors: Yoichi Matsuda, Saitama (JP); Shigeki Yamashita, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 625 days.

(21) Appl. No.: 11/318,541

(22) Filed: Dec. 28, 2005

(65) Prior Publication Data

US 2007/0003159 A1 Jan. 4, 2007

(30) Foreign Application Priority Data

Jul. 4, 2005 (JP) ............................... 2005-194921

(51) Int. Cl.
G06K 9/40 (2006.01)
H04N 1/407 (2006.01)
H04N 5/262 (2006.01)

(52) U.S. Cl. .................. 382/275; 358/3.26; 348/240.99

(58) Field of Classification Search ................ 382/260, 382/261, 274, 275, 289, 291, 294, 295, 298, 382/305, 3.26, 528, 312, 1.2; 358/1.2, 3.26, 358/528; 345/660, 662; 348/240.99
See application file for complete search history.

(56) References Cited

U.S. PATENT DOCUMENTS 4,841,360 A * 6/1989 Birgmeir ..................... 358/521
4,912,569 A * 3/1990 Petilli ......................... 358/465
4,937,682 A * 6/1990 Dalton ........................ 358/461
5,121,198 A * 6/1992 Maronian .................... 358/527
5,381,354 A * 1/1995 Soloff ......................... 708/301
6,272,234 B1 * 8/2001 Krogstad .................... 382/128
6,301,022 B1 * 10/2001 Washio et al. ............... 358/488
6,362,829 B1 * 3/2002 Omvik et al. ............... 345/593

FOREIGN PATENT DOCUMENTS

JP 2001-084365 A 3/2001
JP 2002-247363 A 8/2002
JP 2005-038021 A 2/2005

* cited by examiner

Primary Examiner—Kanji Patel
(74) Attorney, Agent, or Firm—Sughrue Mion, PLLC

(57) ABSTRACT

An image processing device for correcting a deformation of a photographic image of an object to be photographed, the deformation resulting from a photographic position of the object, comprises an inputting unit that inputs the photographic image; an image correcting unit that corrects a deformation of the photographic image inputted by the inputting unit to produce a corrected image; and an image processing unit that performs different image processings that are different from each other for the corrected image corrected by the image correcting unit, the different image processings being performed in different manners in accordance with correction amount by the image correcting unit.

12 Claims, 16 Drawing Sheets

| A1 | ◯ | A3 |

FILTER TYPE A

| D1 | D2 | D3 |
| D4 | ◯ | D6 |
| D7 | D8 | D9 |

FILTER TYPE D

| B1 | B2 | B3 |
| B4 | ◯ | B6 |
| B7 | B8 | B9 |

FILTER TYPE B

| E1 | E2 | E3 |
| E4 | ◯ | E4 |
| E3 | E2 | E1 |

FILTER TYPE E

| C1 | C2 | C3 |
| C4 | ◯ | C6 |
| C7 | C8 | C9 |

FILTER TYPE C

| F1 | F2 | F3 |
| F4 | F5 | F6 |
| F7 | ◯ | F7 |
| F6 | F5 | F4 |
| F3 | F2 | F1 |

FILTER TYPE F

| Ln | FILTER TYPE |
|---|---|
| $1.0 \leq Ln < 1.2$ | A |
| $1.2 \leq Ln < 1.6$ | B |
| $1.6 \leq Ln < 1.8$ | C |
| $1.8 \leq Ln < 2.0$ | D |
| $2.0 \leq Ln < 2.5$ | E |
| $2.5 \leq Ln < 3.0$ | F |

FIG.4

CONTRAST LUT 1

CONTRAST LUT 2

CONTRAST LUT 3

| Ln | LUT NUMBER |
|---|---|
| $1.0 \leq Ln < 1.6$ | 1 |
| $1.6 \leq Ln < 2.0$ | 2 |
| $2.0 \leq Ln < 3.0$ | 3 |

1200

| TRAVEL DISTANCE Dn | FILTER TYPE NUMBER |
|---|---|
| Dn < 4.0 | A |
| 4.0 ≦ Dn < 8.0 | B |
| 8.0 ≦ Dn | C |

| TRAVEL DISTANCE Dn | LUT NUMBER |
|---|---|
| Dn < 4.0 | 1 |
| 4.0 ≦ Dn < 8.0 | 2 |
| 8.0 ≦ Dn | 3 |

FIG.12B

IMAGE PROCESSING DEVICE AND IMAGE PROCESSING METHOD

BACKGROUND OF THE INVENTION

1. Field of the Invention

The present invention relates to an image processing device and image processing method, which correct a deformation in a photographic image of an object to be photographed resulting from the photographic position of the object, and more particularly to an image processing device and image processing method, which reduce the blurriness or the like of an image by carrying out respectively different image processings in accordance with a correction amount for correcting the deformation of a photographic image.

2. Description of the Related Art

There is a field of technology called image processing technology for adjusting the contrast and so forth of digital images taken with a digital camera.

The image processing technology encompasses various methods. For example, there is an image processing method, which is called a spatial filter process, whereby, in order to reduce the noise, and to highlight and extract the lines and edges contained in an image to be processed, picture elements (pixels) in the image are subjected to processing to change the brightness of the pixels by carrying out either a multiply-and-accumulate operation or a nonlinear operation corresponding to the brightness of the pixels in the vicinity of the pixels to be changed. Also, there is an image processing method, which makes use of a table called a LUT (Look Up Table) to record the relationship between the input values and output values of the brightness of the pixels in an image, and changes the brightness of the pixels using the LUT. Also, there is an image processing method called shading compensation, which performs compensation for the irregularities in brightness in an image resulting from the characteristics of the optical system and imaging system at photographing time so that the image has a uniform brightness. Further, there is an image processing method called a binarizing process, which changes an image having gradation to a binary image.

Further, Japanese Patent Application Publication No. 2002-247363 discloses an image processor capable of performing a natural texture removal process even when the manuscript being scanned by a scanner is a stacked manuscript or a manuscript in which there are irregularities at the texture level. Such image processor has an image inputting unit for inputting an image; a texture level detector for detecting the texture level of an inputted image; a stacked manuscript determining unit for determining whether or not an image is a stacked manuscript based on either user instructions or a texture level detected by the texture level detector; a texture level adjusting unit for adjusting the texture level corresponding to the distribution of the texture level detected by the texture level detector, when the manuscript has been determined to be a stacked manuscript; and a texture removal processor for removing the texture of an image at the texture level adjusted by the texture level adjusting unit, is provided so as to enable.

Furthermore, as an example of digital image usage, the practice of using a digital camera to take a photograph of the contents of a whiteboard being used at a meeting to retain as information has become widespread recently. In taking a photograph of the whiteboard, which is a flat object, with a digital camera, the physical relationship between the photographing surface of the digital camera and the whiteboard is ordinarily not parallel, and a photographic position is ordinarily in a position that they are not facing one another. Therefore, parallel straight lines, which form squares on the whiteboard, are photographed distortedly, i.e., not parallelly, in the photographic image, and characters, symbols and so forth written on the whiteboard are photographed in a distorted state, since and the whiteboard is distortedly photographed.

In order to correct the photographic image in which the object is distortedly photographed, Japanese Patent Application Publication No. 2005-38021 provides an image processing apparatus, an image input device, an image processing method, and a program for executing the image processing method on a computer, in which a tilt correction is conducted to another image photographed from only one view point by calculating or selecting a reference front image acquired by photographing the plane-like object and using the front image.

Further, in order to generate via a simple operation a corrected image with no distortions or deformations, from a photographic image in which an object is distortedly photographed, Japanese Patent Application Publication No. 2001-84365 provides an image tilt correction method, which has a step for determining the coordinates of two points corresponding to two end points, which are obtained by projecting the two end points of a first straight line onto a vertical line, which passes through the midpoint of the first straight line of a deformation diagram in a user-specified photographic image; a step for determining the coordinates of two points corresponding to two end points, which are obtained by projecting the two end points of a second straight line onto a vertical line, which passes through the midpoint of the second straight line of a diagram in a user-specified photographic image; a step for determining a radioscopic conversion matrix such that the two end points of a first straight line and the two end points of a second straight line are transformed to the corresponding points, which were determined in the above-mentioned steps; and a step for radioscopically converting the original image based on the obtained radioscopic transformation matrix.

However, for a photographic image in which a distorted photographic image has been photographed, when the distortion in the photographic image is corrected using the technologies described in the Japanese Patent Application Publication No. 2005-38021 and Japanese Patent Application Publication No. 2001-84365, a part of the image data in the image is enlarged as shown in FIGS. 15A through 15C, and FIG. 16. In these technologies, however, in a portion with a higher enlargement ratio, a larger amount of image data is enlarged, and therefore the image tends to become blurry.

SUMMARY OF THE INVENTION

The present invention has been made in view of the above circumstances and an image processing device and method, which is constituted so as to reduce the blurriness of an image by performing image processing, which differs respectively in accordance with the correction amounts for correcting the deformation of a photographic image.

According to an aspect of the present invention, an image processing device for correcting a deformation of a photographic image of an object to be photographed, the deformation resulting from a photographic position of the object, has an inputting unit that inputs the photographic image; an image correcting unit that corrects a deformation of the photographic image inputted by the inputting to produce a corrected image; and an image processing unit that performs different image processings that are different from each other for the corrected image corrected by the image correcting unit, the different image processings being performed in different manners in accordance with correction amount by the image correcting unit.

BRIEF DESCRIPTION OF THE DRAWINGS

Embodiments of the present invention will be described in detail based on the following figures, wherein:

FIG. 3 is a diagram showing an example of a number of types of spatial filters used by a filter adjusting unit to adjust quality;

FIG. 4 is a diagram showing a filter symbol reference table 401 used by an image processing selecting unit 106 when a spatial filter is selected on the basis of a magnification Ln value;

FIG. 12A and FIG. 12B are tables showing a filter symbol reference table 1200 and LUT number reference table 1201 stored in a reference table storing unit 1106;

DETAILED DESCRIPTION OF THE INVENTION

Embodiments of an image processing device and method according to the present invention will be explained in detail below by referring to the attached figures.

Referring first to FIGS. 15A through 15C, and FIG. 16, the blurriness in the corrected image generated by the enlargement process for correcting a photographic image, in which an object has been distortedly photographed, will be explained.

Figure 15A:
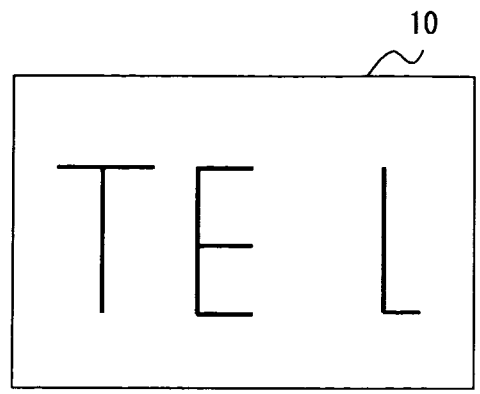
FIGS. 15A through 15C are schematic diagrams showing states, wherein a manuscript 10 prepared on a rectangular piece of paper is photographed using a digital camera, the manuscript 10 is distorted, and an image 30 is photographed as a manuscript image 40.
Figure 15B:
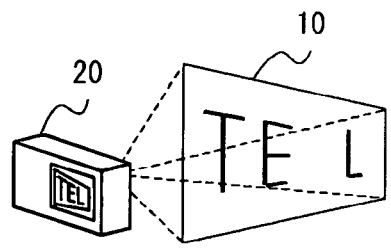
Figure 15C:
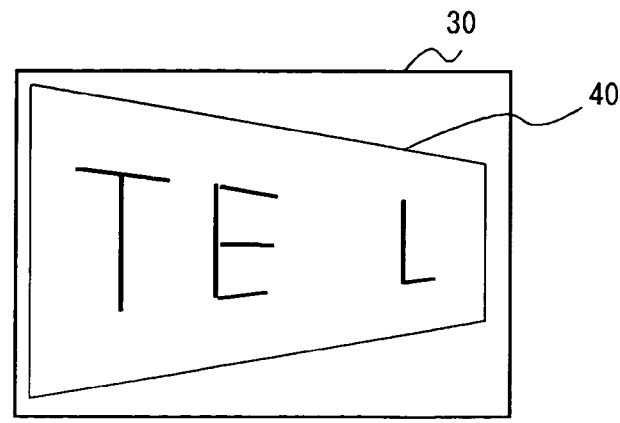

FIGS. 15A through 15C are schematic diagrams showing the states, wherein a manuscript 10 prepared on a rectangular piece of paper is photographed with a digital camera, the manuscript 10 is distorted, and an image 30 is photographed as a manuscript image 40.

Figure 16:
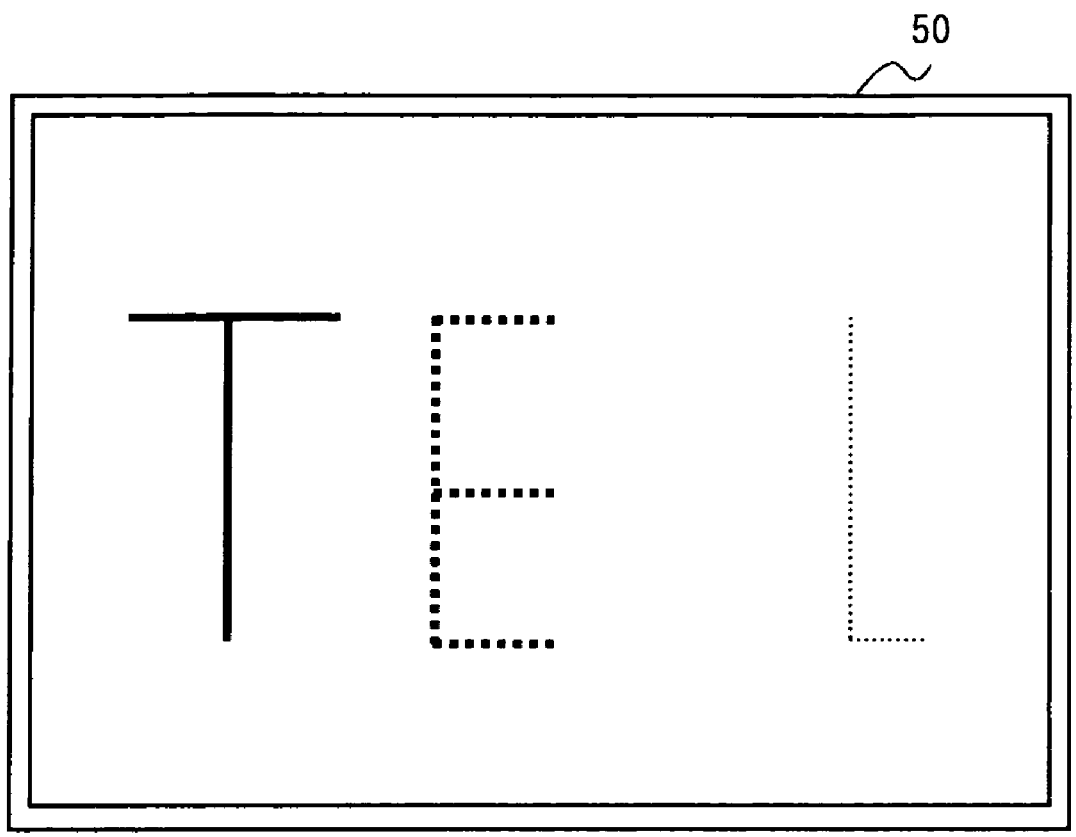
FIG. 16 is a schematic diagram showing an image 50, in which enlargement processing is performed to correct for distortions in an image 30, which is a photographic image in which the manuscript 10, which originally was a rectangle, has been photographed as a trapezoidal manuscript image 40, and the trapezoidal manuscript image 40 is the corrected image for which processing to correct the rectangle was performed.

FIG. 16 is a schematic diagram showing an image 50, in which enlargement processing is performed to correct for distortions in an image 30, which is a photographic image in which the original rectangular manuscript 10 has been photographed as a trapezoidal manuscript image 40, and the trapezoidal manuscript image 50 is the corrected image for which processing to correct the rectangle was performed.

FIG. 15A is a schematic diagram showing a rectangular manuscript 10, which is to be photographed; FIG. 15B is a diagram showing the state, wherein the manuscript 10 will be photographed with a digital camera 20; and FIG. 15C is a schematic diagram showing an image 30 depicting a manuscript image 40, which is a photographic image in which the manuscript 10, having distortions and other such deformations, is photographed in a trapezoidal condition using a digital camera 20.

As shown in FIG. 15B, when the original rectangular manuscript 10 is photographed such that the physical relationship between the digital camera 20, which is the photographing device, and the manuscript 10, which is the object, is not a face-to-face orientation, as with the image 30 shown in FIG. 15C, this manuscript 10 is photographed as a photographic image in which the object is distortedly photographed like the distorted image 30 in which a group of lines, which exist parallelly in the original manuscript 10, run diagonally in a nonparallel state.

Accordingly, when processing is carried out on the image 30 to correct the manuscript image 40 to a square or rectangle by correcting the deformation, the higher the enlargement value of a location, the greater the magnification for that location, and the travel distance, which is the distance the pixels in the photographic image move, also increases, causing the pixels to become dispersed (the enlargement ratio for the letter "L" is greater than that for the letter "E" in the image 30), and, like the corrected image of the image 50 shown in FIG. 16, the original pixels in those locations where the enlargement value is the greatest become dispersed more, causing a phenomenon in which the image in the corrected image is blurred.

As shown in FIG. 16, this is a phenomenon in which blurriness is generated by the dispersion of the original pixels in the letter "L" compared to that in the letter "E" due to the enlargement ratio for enlarging the data being greater for the letter "L" of the manuscript image 40 than for the letter "E".

First Embodiment

First of all, the functional configuration of an image processing device according to the first embodiment will be explained by referring to FIG. 1.

The image processing device described in this embodiment primarily will be explained as a personal computer having the functional configuration described in reference to FIG. 1.

Figure 1:
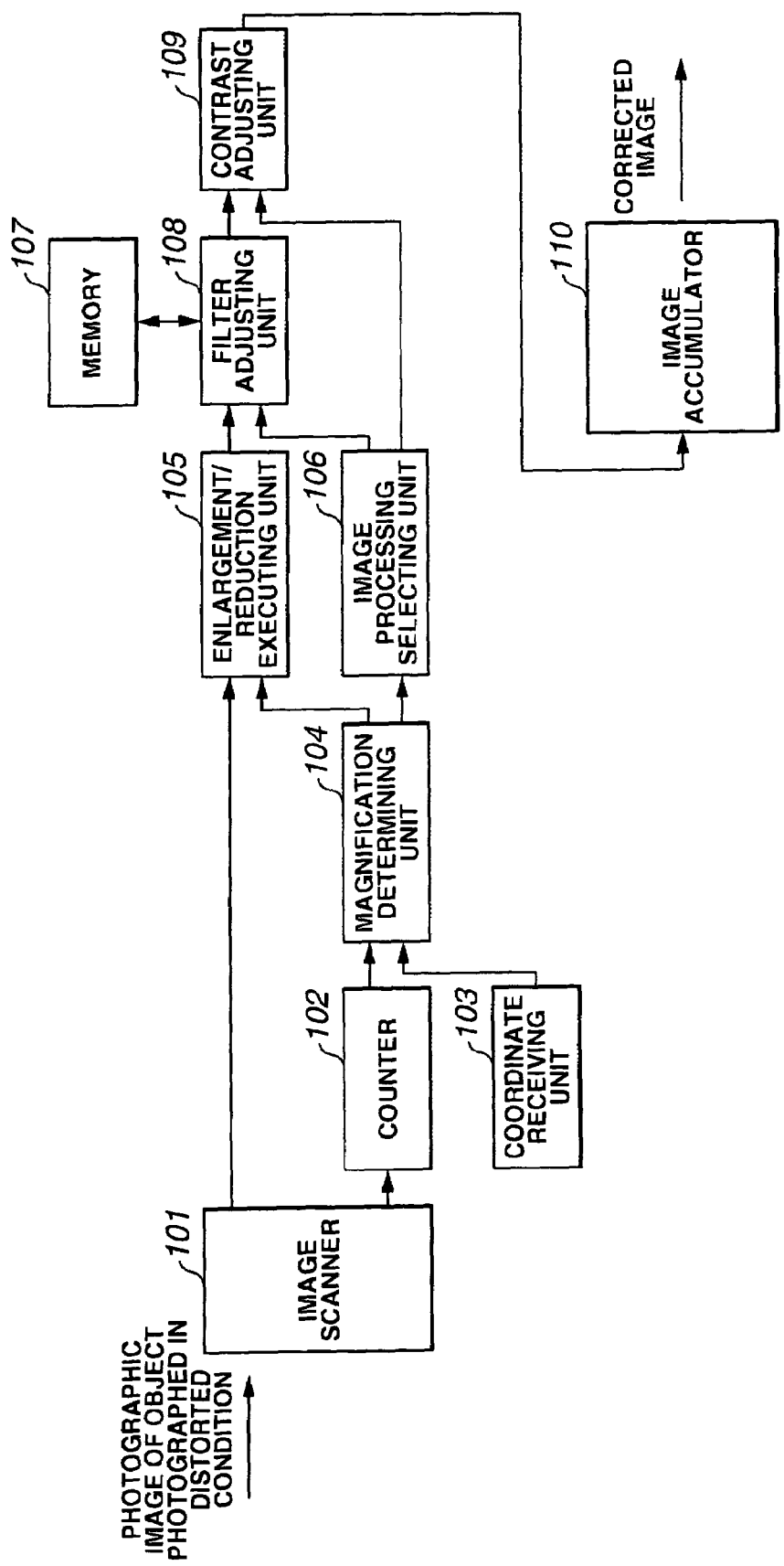
FIG. 1 is a diagram showing a functional configuration having an image processing device according to an embodiment of the present invention.

FIG. 1 is a block diagram showing a functional configuration provided in an image processing device according to the first embodiment.

An image processing device according to the first embodiment has an image scanner 101; a counter 102; a coordinate receiving unit 103; a magnification determining unit 104; an enlargement/reduction executing unit 105; an image processing selecting unit 106; a memory 107; a filter adjusting unit 108; a contrast adjusting unit 109; and an image accumulator 110.

The image scanner 101 scans a correction image, for which correction of a deformation in a photographic image in which a photographic image was distortedly photographed is performed, reads image data having a pixel, which is one part of the image being scanned, and which is scanned one scan at a time, and sends a signals to the counter 102 at the start of scanning.

The width of the image data read during one scan will be explained as being one pixel, but plural pixel widths can also be read during a single scan.

The counter 102 receives a signal from the image scanner 101, counts the positional data of a line of a digital image scanned by the image scanner 101, and sends the positional data in a photographic image of a line scanned by the image scanner 101 to the magnification determining unit 104.

As for the coordinate receiving unit 103, the coordinates of the four corners of a trapezoid of a digital image, for which correction of deformation in a photographic image in which a photographic image was distortedly photographed will be performed, is inputted either automatically or by a user, and is received in the coordinate receiving unit 103.

When these coordinates are inputted automatically, a four-corner detector not shown in the figure detects the coordinates of the four corners of a square, which is a trapezoid in which a photographic image was distortedly photographed, the coordinates of the four corners of the deformed image are inputted, and received in the coordinate receiving unit 103.

When these coordinates are inputted by a user, the user clicks on the points of the four corners using a mouse comprised on a personal computer, which is the image processing device, and the coordinates of the four corners of the square, the deformation of which is to be corrected, are inputted.

Or, the coordinates of the four corners of a deformed image are inputted in accordance with a user matching a square deformation frame, which is deformed by a user operation, to the periphery of the image of the square for which deformation is to be corrected, and these coordinates are received by the coordinate receiving unit 103.

The magnification determining unit 104 receives the digital image line data scanned by the image scanner 101 from the counter 102, and receives the coordinates received by the coordinate receiving unit 103, and on the basis of the received line data and coordinates, determines the magnification for enlarging the image data scanned by the image scanner 101 in order to correct the deformation in a photographic image.

The enlargement/reduction executing unit 105 corrects an inputted photographic image by using a magnification sent from the magnification determining unit 104 to execute enlargement processing of image data, which has the image data scanned by the image scanner 101, and converting the respective pixels in the image to coordinate locations.

The image processing selecting unit 106 selects, on the basis of a magnification determined by the magnification determining unit 104, a spatial filter used by the filter adjusting unit 108 to adjust image quality, and a LUT used by the contrast adjusting unit 109 to adjust contrast.

The memory 107 stores the spatial filter used when image quality is adjusted by the filter adjusting unit 108, and the memory 107 is used when image quality is adjusted.

The filter adjusting unit 108 uses a spatial filter selected by the image processing selecting unit 106 to adjust the image quality of the image data enlarged by the enlargement/reduction executing unit 105.

The contrast adjusting unit 109 uses a LUT selected by the image processing selecting unit 106 to adjust the contrast of the image data, the image quality of which has been adjusted by the filter adjusting unit 108.

The image accumulator 110 accumulates image data, which has been adjusted by the contrast adjusting unit 109.

When all the image data of an inputted photographic image has been scanned by the image scanner 101, and the image accumulator 110 has received the processed data from the contrast adjusting unit 109, the received image data is synthesized, producing a corrected image, in which distortion and other deformations have been corrected.

Next, a state, wherein, when the image scanner 101 scans the image 30 shown in FIG. 15C, the image 30, which is a digital image, is scanned, and a magnification for enlargement is determined by the magnification determining unit 104, will be explained by referring to FIG. 2.

Figure 2:
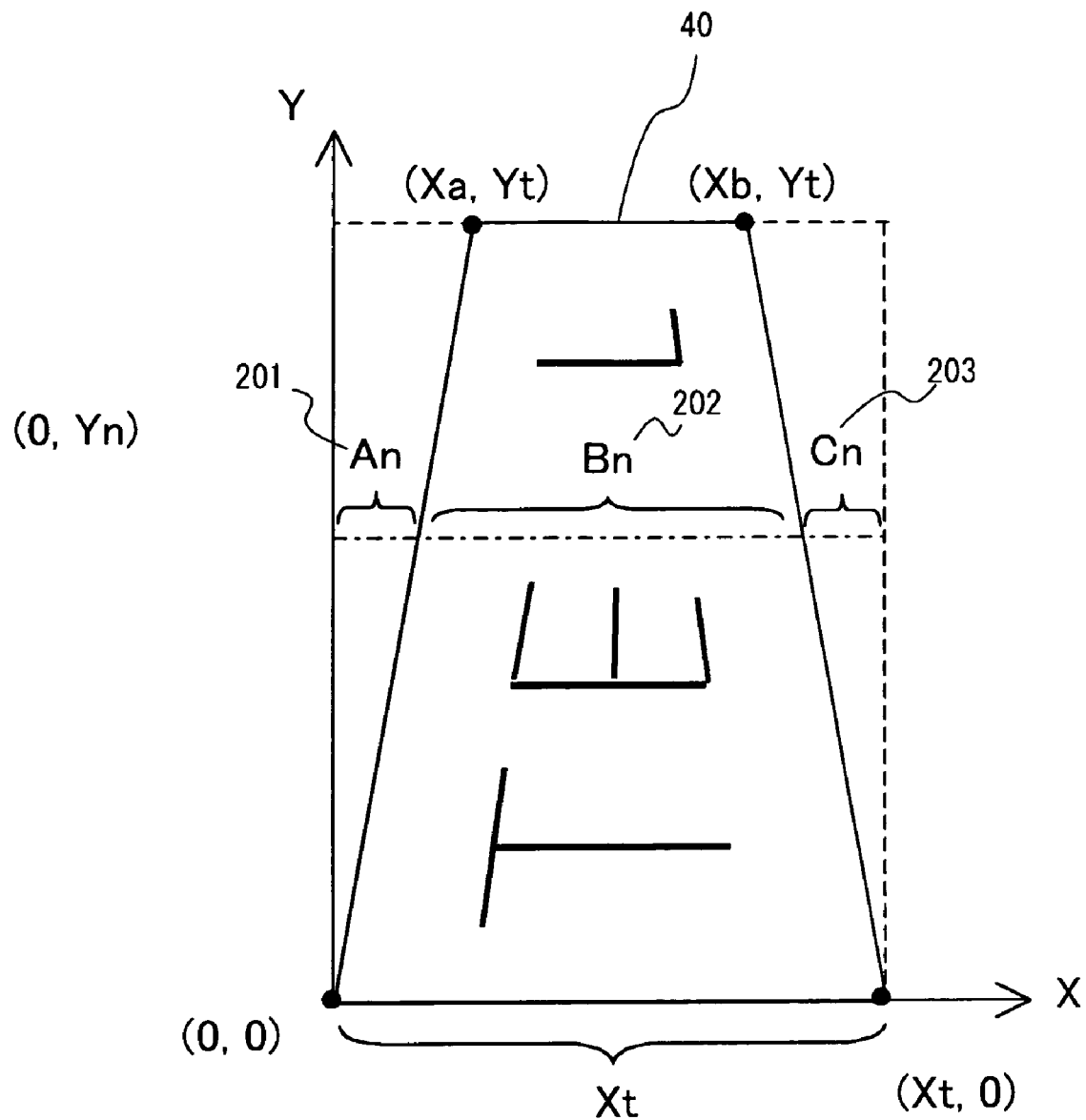
FIG. 2 is a schematic diagram illustrating a state, wherein, when an image scanner 101 scans the image 30 shown in FIG. 15C, a magnification for enlargement is determined by a magnification determining unit 104 by scanning the image 30, which is a digital image.

FIG. 2 is a schematic diagram illustrating a state, wherein, when an image scanner 101 scans the image 30 shown in FIG. 15C, a magnification for enlargement is determined by the magnification determining unit 104 by scanning the image 30, which is a digital image.

When the coordinates of the four corners of the trapezoidal manuscript image 40, which was photographed in a distorted condition, inside the image 30 shown in FIG. 15C, which was photographed using a digital camera 20, are received by the coordinate receiving unit 103, the direction of enlargement processing to be performed to correct the deformation of the manuscript image 40 is set to the X-axis, one point of the four corners of the square, which is a trapezoid, is set to the point of origin of a coordinate system having an X-axis and a Y-axis, and the deformed manuscript image 40 is aligned with the coordinate system having an X-axis and a Y-axis as shown in FIG. 2.

When the manuscript image 40 is aligned with the coordinate system having an X-axis and a Y-axis, the image scanner 101 commences scanning the trapezoidal manuscript image 40, which is aligned to the coordinate system, from the point of origin, treating the X-axis as the primary scanning direction, and the Y-axis as the secondary scanning direction.

As an example for explaining scanning, scanning in the Y-axis direction, which is scanning that is performed in the X-axis direction from point (0, Yn), and the method for determining the magnification for enlarging the scanned image data, which is determined by the magnification determining unit 104, will be explained by referring to FIG. 2.

The coordinates of the four corners of the trapezoid of the manuscript image 40, as shown in FIG. 2, constitute point (0, 0), point (Xt, 0), point (Xt, Ya), and point (Xb, Yt), and since the largest X-coordinate value of the coordinate values of the four points is Xt, and the largest Y-coordinate value is Yt, the trapezoid of the manuscript image 40 will be enlarged to a rectangle (a square when Xt=Yt), which treats the two points, the point of origin (0, 0) and point (Xt, Yt), as a rectangle in order to correct for the deformation.

From the image data scanned in the X-axis direction from point (0, Yn), Bn 202, which is the width that the manuscript image 40 occupies on a manuscript image 40-scanned line, is determined, and Ln, which is the magnification by which the scanned image data is to be enlarged, is determined from the equation: Ln=Xt÷Bn.

That is, since Bn is determined by subtracting from Xt the An 201, the one side of the line portion, and the CN 203, the other side of the line portion, which do not comprise the manuscript image 40 inside the rectangle (or square), which treats the two points on the scanning line, the point of origin (0, 0) and the point (Xt, Yt), as a rectangle, the equation for determining Bn is Bn=Xt−An−Cn.

When scanning of the manuscript image 40 by the image scanner 101 commences from point (0, Yn), the image scanner 101 sends a signal to the counter 102, the number of times that scanning is carried out is counted in the counter 102, the counter 102 sends the counted number of scans to the magnification determining unit 104, and based on the number of scans sent from the counter 102, the magnification determining unit 104 determines Yn, which is the Y coordinate of the point at which scanning commenced, and determines the coordinate value of (0, Yn), which is the coordinate of the point where scanning commenced.

Further, since the points of the four corners of the manuscript image 40 trapezoid are received from the coordinate receiving unit 103, and because An=Xa×Yn÷Yt and Cn=(Xt−Xb)×Yn÷Yt, An and Cn are determined from the coordinates of the four points of the four corners, and by substituting the determined An and Cn in the equation for determining the above-mentioned Bn and Ln, Ln becomes Ln=(Yn(Xb−Xa)+Xt (Yt−Ya))÷(Yt×Xt), and the magnification Ln is determined from the coordinates of the points of the four corners.

Thus, Ln, which is the magnification for enlarging the image data scanned from the point (0, Yn), is determined in this manner.

Next, a number of spatial filters utilized in the filter adjusting unit 108 to adjust image quality will be explained by referring to FIG. 3.

FIG. 3 is a diagram showing an example of a number of spatial filters utilized in the filter adjusting unit 108 to adjust image quality.

As shown in FIG. 3, the numerous spatial filters utilized in the filter adjusting unit 108 are filters, which have a different number of filter systems and filter sizes, and a spatial filter is selected by the image processing selecting unit 106 based on the magnification Ln determined by the magnification determining unit 104.

Next, the state, wherein a spatial filter is selected by the image processing selecting unit 106 based on the value of the magnification Ln, will be explained by referring to FIG. 4.

FIG. 4 is a diagram showing a filter symbol reference table 401, which is used when the image processing selection unit 106 selects a spatial filter based on the value of the magnification LN.

As shown in FIG. 4, the symbols of spatial filters, which are selected on the basis of the value of a magnification Ln determined by the magnification determining unit 104, are listed in table format in a filter symbol reference table 401.

For example, when the value of the magnification Ln determined be the magnification determining unit 104 is 1.3, the spatial filter of symbol B is selected from the filter symbol reference table 401 in the image processing selection unit 106.

Then, the spatial filter of symbol B, which is selected by the image processing selection unit 106, is used by the filter adjusting unit 108 to carry out image processing for adjusting the image quality of the image data scanned from point (0, Yn).

Next, a number of LUTs utilized by the contrast adjusting unit 109 to adjust image quality will be explained by referring to FIG. 5.

Figure 5:
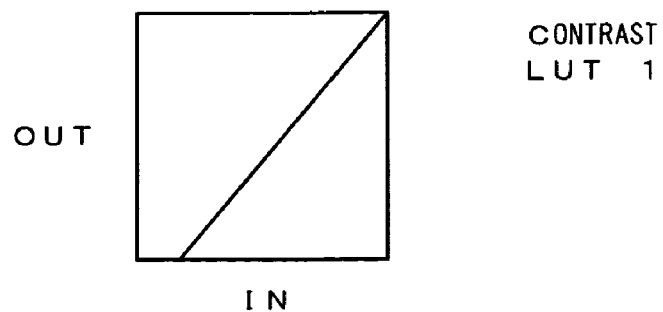
FIG. 5 is a diagram showing an example of a number of types of LUTs used in a contrast adjusting unit 109 to adjust contrast.
Figure 5:
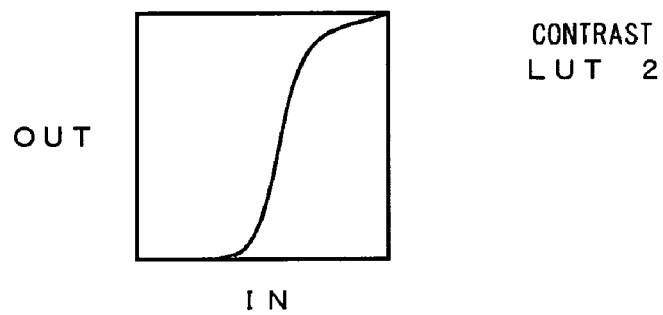
Figure 5:
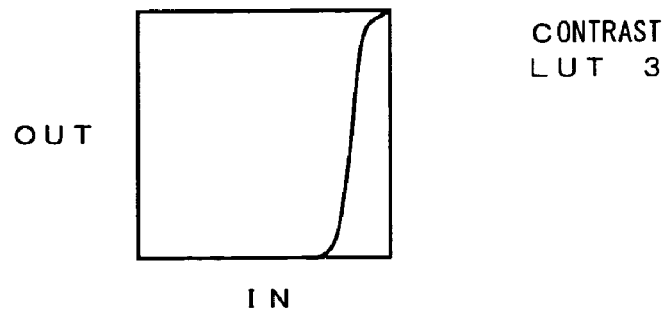

FIG. 5 is a diagram showing an example of numerous LUTs used in the contrast adjustment by the contrast adjusting unit 109.

As shown in FIG. 5, a number of tables of LUTs of different contents is provided in the contrast adjusting unit 109, and one LUT is selected from the numerous tables by the image processing selection unit 106 on the basis of the magnification Ln determined by the magnification determining unit 104.

Next, the state, wherein a LUT is selected by the image processing selection unit 106 based on the value of a magnification Ln, will be explained by referring to FIG. 6.

Figure 6:
FIG. 6 is a diagram showing a LUT number reference table 601 used by the image processing selecting unit 106 when a LUT is being selected on the basis of a magnification Ln value.

FIG. 6 is a diagram showing a LUT number reference table 601, which is used when a LUT is selected by the image processing selection unit 106 on the basis of the value of a magnification Ln.

As shown in FIG. 6, the numbers of LUTs, which are selected on the basis of the value of a magnification Ln determined by the magnification determining unit 104, are listed in the LUT number reference table 601.

For example, when the value of a magnification Ln determined by the magnification determining unit 104 is 1.2, the LUT 1 of number one is selected from the LUT number reference table 601.

Then, contrast adjustment of the image data, for which image quality had been adjusted by the filter adjusting unit 108, is performed by the contrast adjusting unit 109 in accordance with the LUT of number one selected by the image processing selecting unit 106.

Next, the flow of processing, in an image processing device and method according to the first embodiment, for image processing, which corrects a deformation such that blurriness does not occur in a photographic image, in which an object was photographed in a distorted or otherwise deformed condition, will be explained by referring to FIG. 7.

Figure 7:
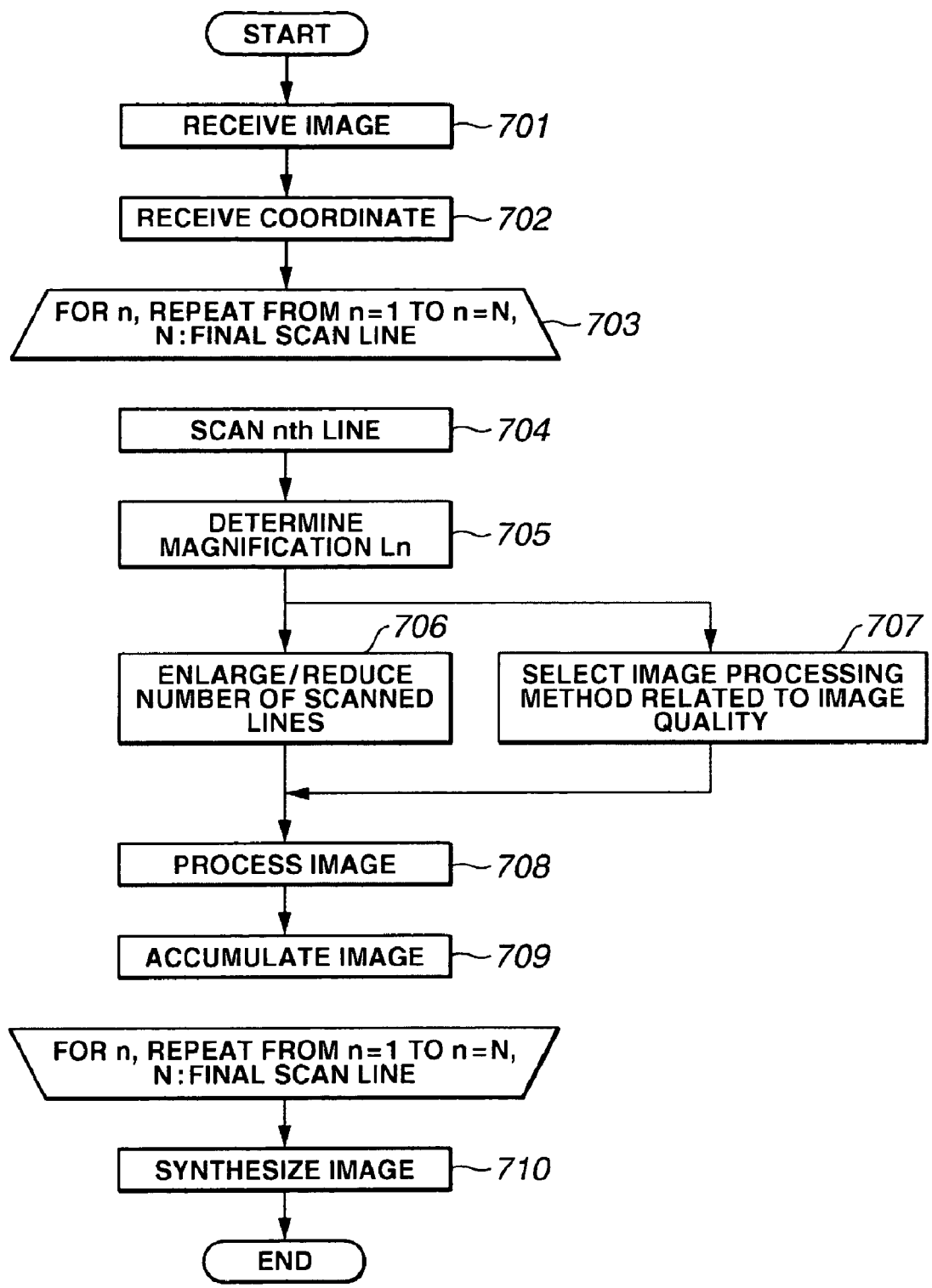
FIG. 7 is a flowchart showing the flow of processing, in an image processing device and method according to an embodiment of the present invention, for image processing, which corrects a deformation such that blurriness is not generated in an image in a photographic image in which an object was photographed in a distorted or otherwise deformed condition.

FIG. 7 is a flowchart showing the flow of processing, in an image processing device and method according to the first embodiment, for image processing, which corrects a deformation such that blurriness does not occur in an image in a photographic image in which an object was photographed in a distorted or otherwise deformed condition.

In an image processing device and method according to the first embodiment, first of all, an image 30, which has a manuscript image 40, in which a digital camera-photographed manuscript 10 has been photographed in a deformed condition, is sent by way of either a general-purpose interface or media to a personal computer, which is an image processing device having the functional configuration explained by referring to FIG. 1, and the image 30 is received by the personal computer, which is an image processing device (Step 701).

Then, in accordance with a user operation, the coordinates of four corners of a square, having a deformation inside the photographic image, is inputted to the personal computer, and received by the coordinate receiving unit 103 (Step 702).

Then, the following processing is performed on n scan lines in the Y-axis direction, which is the secondary scanning direction, from n=1 to the last line of n=N, relative to image data constituted from the nth line of pixels of the Y-axis direction of the manuscript image 40 (Step 703).

First, the nth line of pixels in the Y-axis direction is scanned from the point (0, Yn) in the X-axis direction, which is the primary scanning direction (Step 704).

When scanning of the nth line of the manuscript image 40 is carried out in the primary scanning direction in Step 704, the magnification determining unit 104 receives the number of times that scanning occurred from the counter 102, and the magnification determining unit 104 receives from the coordinate receiving unit 103 the coordinates of the four corners of a trapezoid, which was photographed in a deformed condition, and the enlargement ratio Ln is determined by the magnification determining unit 104 based on the received number of times scanning occurred and coordinates of the four corners of the trapezoid (Step 705).

When the enlargement ratio Ln is determined in Step 705, the image data scanned by the image scanner 101 is enlarged by the magnification Ln in the enlargement/reduction executing unit 105 (Step 706).

Further, when the enlargement ratio Ln is determined in Step 705, the magnification Ln is sent to the image processing selecting unit 106 from the magnification determining unit 104, various spatial filters are selected using the filter symbol reference table 401 on the basis of the magnification Ln in the image processing selecting unit 106 (Step 707), and then various LUTs are selected by the LUT number reference table 601 (Step 707), the selected various spatial filters are sent to the filter adjusting unit 108, and the selected various LUTs are sent to the contrast adjusting unit 109.

When enlargement processing of the image data, which is constituted from the scanned nth line of pixels, is complete, the various spatial filters, which were selected by the filter adjusting unit 108, have been sent, and the various LUTs, which were selected by the contrast adjusting unit 109, have been sent, the image data, which underwent enlargement processing, is subjected to image processing for adjusting the image quality using the filter adjusting unit 108 and contrast adjusting unit 109.

When enlargement processing of image data as explained by referring to FIGS. 15A through 15C, and FIG. 16 is carried out, since the travel distance of the pixels in image data having a high enlargement ratio becomes long, making blurriness apt to occur as with the letter "L" of the manuscript image 40, the filter symbol reference table 401 and the LUT number reference table 601 are constituted such that a spatial filter, which reinforces the edge of line image data subjected to enlargement processing, in which the enlargement ratio for enlarging the scanned line image data was high, is selected by the image processing selecting unit 106, and a LUT for further strengthening contrast is selected by the image processing selecting unit 106, and image processing for highlighting the edge and strengthening the contrast is carried out for the scanned line image data (Step 708).

When image processing for image quality adjustment is performed on enlarged image data, the image data for which image quality adjustment was performed is accumulated in the image accumulator 110 (Step 709).

Thus, the processing from Step 704 through Step 709, which was processing for enlarging the image data having pixels located in the nth line of the Y-axis direction, which is the secondary scanning direction, and processing for adjusting image quality, is performed for a number of lines in the secondary scanning direction, from n=1 to N, which is the last line of the image (Step 703).

Figure 8:
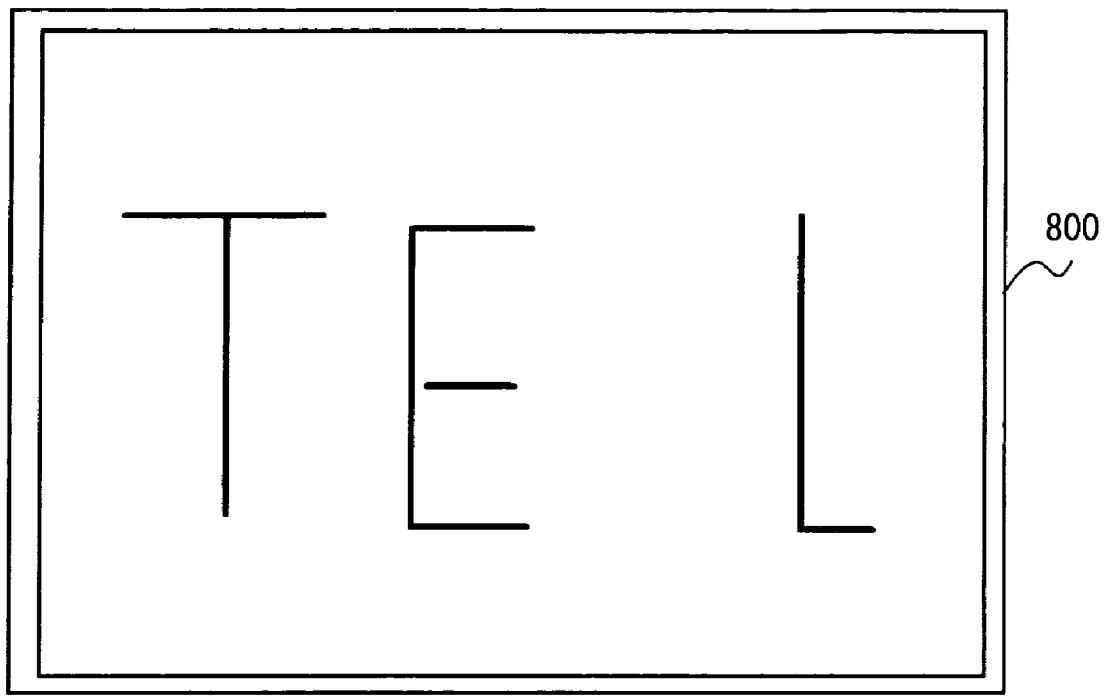
FIG. 8 is a schematic diagram showing an image 800, in which a manuscript image 40, which was distortedly photographed in the image 30 shown in FIG. 15C, has been corrected and generated, without blurriness occurring, by a personal computer, which is an image processing device according to an embodiment of the present invention, having the functional configuration explained by referring to FIG. 1.

By so doing, when the processing from Step 704 to Step 709 is performed in the secondary scanning direction up to n=N, the image data accumulated in the image accumulator 110 is synthesized (Step 710), and there is generated the image 800 shown in FIG. 8, in which the location, which was enlarged to correct for deformation, is not blurred.

FIG. 8 is a schematic diagram showing a generated image 800, in which the manuscript image 40, which was photographed in a deformed condition inside the image 30 shown in FIG. 15C, has been corrected so that there is no blurriness, by using a personal computer, which is an image processing device according to the first embodiment having the functional configuration explained by referring to FIG. 1.

When the deformation of the manuscript image 40 inside the image 30 shown in FIG. 15C is corrected, with conventional technology, there was a tendency for the image (the letter "L" part) of the image data having a high enlargement ratio to be blurry, as in the image 50 shown in FIG. 16, but when correction is done using a personal computer, which is an image processing device according to the first embodiment, the deformation of the image (the letter "L" part) of the image data having a high enlargement ratio, which tended to be blurry with conventional technology, can be corrected without blurriness, as in the image 800 shown in FIG. 8.

Furthermore, in this embodiment, when an image processing device and method according to the first embodiment modify a trapezoid or other such image photographed in a deformed condition to a rectangle or square, the explanation provided was such that the method for adjusting image quality is selected on the basis of an enlargement ratio for enlarging an image in the enlargement/reduction executing unit 105, but the present invention is not limited to enlargement processing, which is carried out in the enlargement/reduction executing unit 105, and when reduction processing is required for modifying a trapezoid or other such image photographed in a deformed condition to a rectangle or square, reduction processing is carried out in the enlargement/reduction executing unit 105, the method for adjusting image quality is selected by the image processing selecting unit 106 on the basis of a reduction magnification for reducing an image, and image processing for adjusting image quality is performed.

Furthermore, as explained in this embodiment, for an image, which is subjected to image processing using an image processing device and method according to the first embodiment, even when a deformation is corrected by performing enlargement/reduction processing on an image, which is not only deformed in the X-axis direction, but in two or more axial directions, for example, not only in the X-axis direction, but also in the Y-axis direction, it is also possible for an image quality adjustment method to be selected on the basis of an enlargement/reduction ratio, which corrects the deformation of the Y-axis, and for image processing to be carried out in accordance with the selected adjustment method.

Furthermore, combining an image processing device according to the first embodiment with a personal computer makes in possible to use an image, which was photographed using a camera-equipped mobile telephone or a digital camera, in a variety of applications.

Next, a utilization example, in which an image processing device according to the first embodiment is combined with a personal computer, and an image, which was photographed using a camera-equipped mobile telephone or a digital camera, is processed by the image processing device according to the first embodiment, and is used in a variety of applications, will be explained by referring to FIG. 9.

Figure 9:
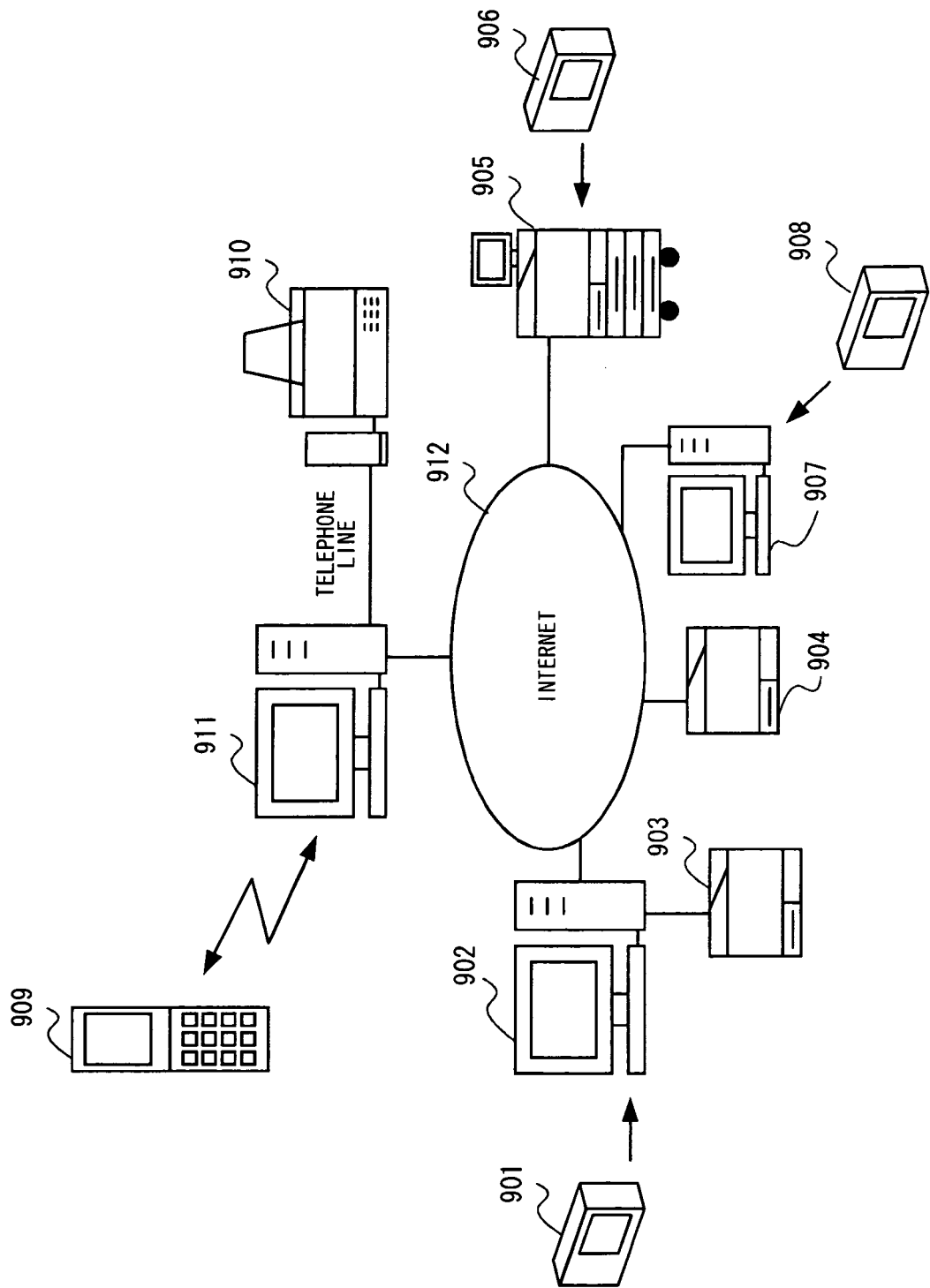
FIG. 9 is a schematic diagram showing a usage example, in which an image taken with a camera-equipped mobile telephone or a digital camera is processed by the image processing device and utilized in a variety of applications by a computer having the configuration of an image processing device according to an embodiment of the present invention.

FIG. 9 is a schematic diagram showing a usage example, in which an image, which was photographed using a camera-equipped mobile telephone or a digital camera, is processed by the image processing device and utilized in a variety of applications by a computer having the configuration of an image processing device according to the first embodiment.

As shown in FIG. 9, a controller 902 having the configuration of an image processing device according to the first embodiment; a mobile telephone Web server 911 having the configuration of an image processing device according to the first embodiment; an image forming device 905 having the configuration of an image processing device according to the first embodiment; a network printer 904; and a computer 907 are connected to the Internet 912.

The controller 902 can be dedicated hardware having the configuration of an image processing device of the present invention, or it can be constituted by installing software using an image processing method according to the first embodiment in a personal computer.

An image photographed with the digital camera 901 is sent to the controller 902 by way of either a general-purpose interface or a media, the sent image is subjected to processing by the controller 902 for correcting a deformation so as to eliminate blurriness, and the corrected image is digitally stored inside the controller 902.

An image, which is digitally stored in the controller 902, can be fetched and utilized by a computer, which is connected to either the Internet or a not-shown network to which the controller 902 is connected.

Further, an image processed by the controller 902 can also be subjected to standard variable power processing and printed out on a printer 903 connected to the controller 902.

In addition, an image processed by the controller 902 can of course also be printed out on a network printer 904 connected to the Internet 912.

Further, the image forming device 905 is supposed to be an image forming device, which is installed at a convenience store or some other such store for printing images photographed by a digital camera, and by inputting an image photographed using the digital camera 906 into the image forming device 905, the deformation of an object will be corrected in accordance with the functionality of the image processing device according to the first embodiment, which has the image forming device 905, without the photographic image having a distorted or otherwise deformed object becoming blurry.

As another way of using the image forming device 905, it is also possible to constitute the present invention such that an image photographed using a digital camera 908 is sent to a computer 907 connected to the Internet 912, a print order is submitted to the image forming device 905 via the computer 907, the photographic image, in which an object photographed using the digital camera 908 was photographed in a distorted condition, has the deformation corrected by the image forming device 905 to eliminate blurriness, and the image corrected by the image forming device 905 is printed and delivered to the user.

Further, it is also possible to constitute the present invention such that an image photographed using a camera-equipped mobile telephone 909 is sent to a Web server 911 using a mobile telephone network, the photographic image, in which an object was photographed in a distorted condition, has the deformation corrected by the Web server 911 so as to eliminate blurriness, and the corrected image is returned to the camera-equipped mobile telephone 909.

Further, an image, which has had a deformation corrected by the Web server 911, can also be sent to a facsimile device 910 using a telephone line.

Furthermore, it is also possible to utilize an image processing device according to the first embodiment such that deformations of images of a manuscript and whiteboard inside a conference room, which were photographed using a zoom-equipped camera mounted in the ceiling of the conference room, are corrected, and the contents written on the manuscript and whiteboard inside a conference room are digitized.

Next, a state, wherein an image processing device according to the first embodiment is utilized such that the in-image deformations of images of a manuscript and whiteboard inside a conference room, which were photographed using a zoom-equipped camera mounted in the ceiling of the conference room, are corrected, and the contents written on the manuscript and whiteboard inside a conference room are digitized, will be explained by referring to FIG. 10.

Figure 10:
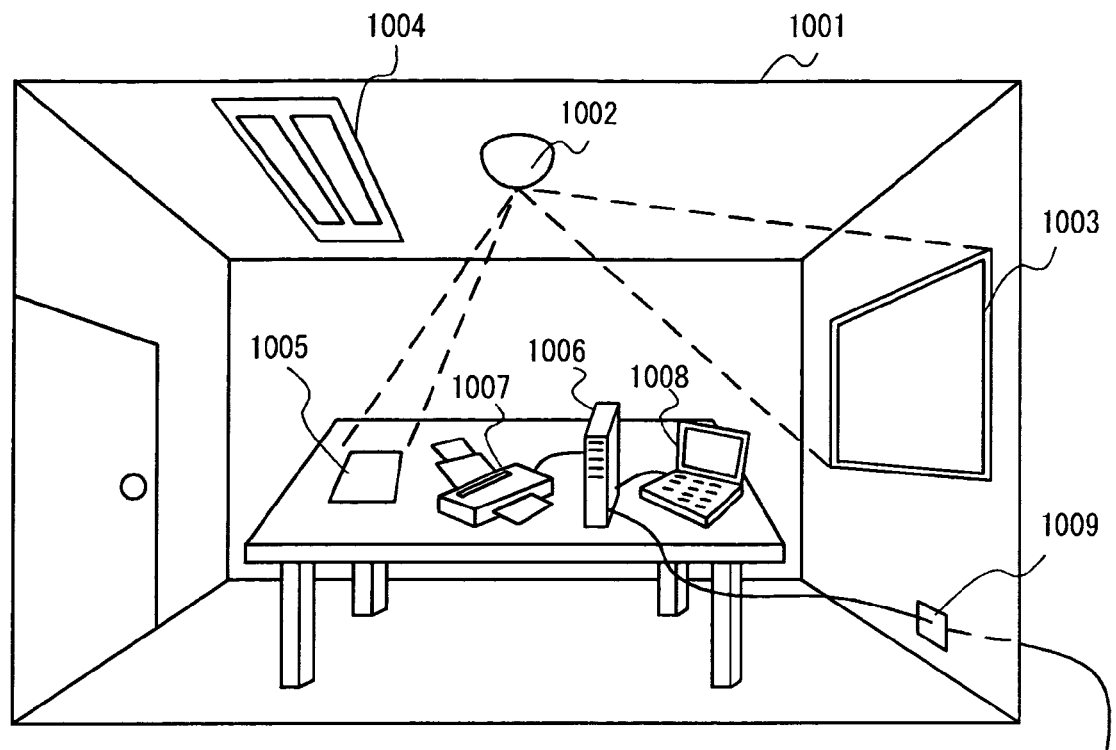
FIG. 10 is a schematic diagram showing a state, wherein the deformation of the images of a manuscript and a whiteboard inside a conference room, which were photographed via a zoom-equipped camera positioned in the ceiling of the conference room, are corrected, and the contents written on the manuscript and whiteboard inside the conference room are digitized, using an image processing device according to an embodiment of the present invention.
Figure 10:
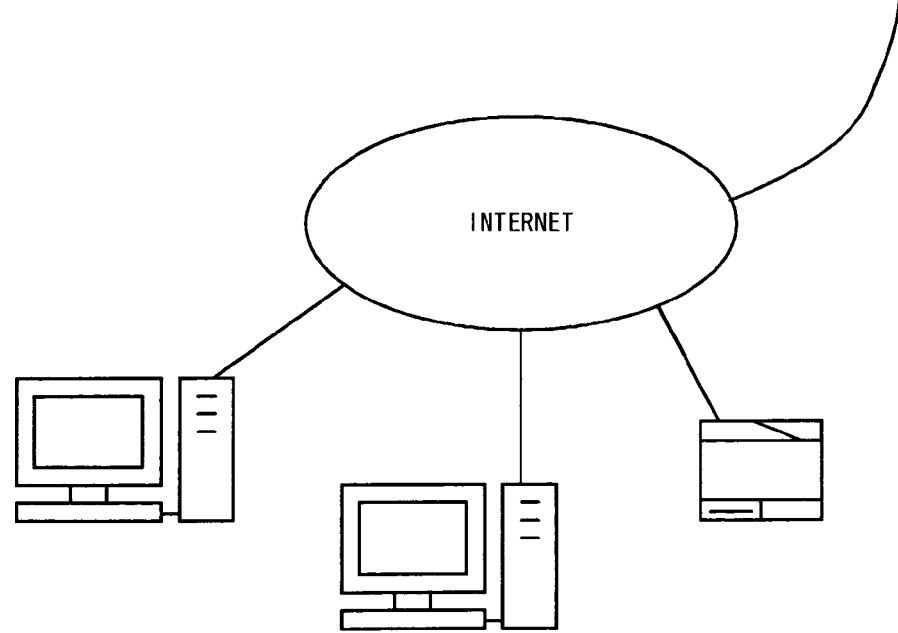

FIG. 10 is a schematic diagram showing a state, wherein deformations of the images of a manuscript and a whiteboard inside a conference room, which were photographed via a zoom-equipped camera mounted in the ceiling of the conference room, are corrected, and the contents written on the manuscript and whiteboard inside the conference room are digitized, using an image processing device according to the first embodiment.

As shown in FIG. 10, a zoom-equipped camera 1002 and a light fixture 1004, which constitutes the light source of a conference room 1001, are provided in the ceiling part of the conference room 1201(?1001), a whiteboard 1003 is hung on a wall of the conference room 1001, an image processing device 1006 applicable to the present invention, a manuscript 1205(1005) to be used in a meeting, a personal computer 1008, and a printer 1007 are on top of a desk in the conference room 1001, and a LAN connector 1009 is mounted in a wall of the conference room 1001.

The zoom-equipped camera 1002 is capable of photographing the entire interior of the conference room 1001.

The whiteboard 1003 is an ordinary whiteboard vice a digital board, arbitrary letters and symbols are recorded on the whiteboard 1003 by a user, it is photographed by the zoom-equipped camera 1002, and the image of the photographed whiteboard 1003 is processed by the image processing device 1006.

The light fixture 1004 is the light source, which shines on an object to be photographed by the zoom-equipped camera 1002.

The manuscript 1005 is a manuscript, which records content on a piece of paper, and which will be used in a meeting, and this manuscript 1005 is photographed by the zoom-equipped camera 1002, and the image of the photographed manuscript 1005 is processed by the image processing device 1006.

The image processing device 1006 is an image processing device according to the first embodiment, has the functional configuration of the image processing device according to the first embodiment, which was explained by referring to FIG. 1, and possesses functionality for correcting a deformation by modifying a photographic image, in which an object was photographed in a distorted condition, so that blurriness does not occur.

The printer 1007 prints out an image, which has been processed by the image processing device 1006.

The personal computer 1008 has an operating panel, which is used as needed by a user to specify the locations of the four corners of the manuscript 1005 or whiteboard 1003 photographed by the zoom-equipped camera 1002, and to print out an image processed by the image processing device 1006 on the printer 1007.

In addition, it is also possible to use the personal computer 1008 to specify the photographic range to be photographed by the zoom-equipped camera 1002, and to specify locations, which are not to be photographed by the zoom-equipped camera 1002 for security reasons.

Now then, the image processing device 1006 is connected to the Internet by way of the LAN connector 1009 in the conference room 1001, making it possible to send the contents of the whiteboard 1003 and manuscript 1005, which have been subjected to image processing by the image processing device 1006 to correct deformations, to another conference room in an electronic conferencing system utilizing the Internet.

Thus, by utilizing the image processing device 1006 in the conference room 1001 shown in FIG. 10, it is possible, when copying a manuscript to be used in a conference, to obtain a clear, deformation-corrected image of a manuscript 1005 by using the image processing device 1006 to correct a photographic image of a manuscript 1005 photographed by the zoom-equipped camera 1002, and printing out the corrected image on the printer 1007, without having to carry the manuscript to a device equipped with a scan function as in the past, and it is possible to use an inexpensive whiteboard rather than an electronic board, to photograph the contents recorded on the whiteboard using the zoom-equipped camera 1002, and to obtain a clear, deformation-corrected image of the contents of the whiteboard by using the image processing device 1006 to correct a photographic image of the photographed whiteboard 1003, enabling the contents written on the whiteboard 1003 to be digitized without using a electronic board.

Second Embodiment

In the first embodiment, an explanation was given for an image processing device and method, whereby, when a deformation in a photographic image, in which an object to be photographed was photographed in a distorted or otherwise deformed condition, is to be corrected using the image processing device, image processing, which differs in accordance with the enlargement ratio, is selected, and image processing for adjusting the image quality is performed, but in this embodiment, an image processing device and method, which, because the respective pixels inside an image are moved when an inputted photographic image is subjected to deformation correction in accordance with enlargement and reduction processing, are constituted such that the distance, which the pixels are moved (the correction value), is measured, a corrected image is divided into plural areas in accordance with this measured distance, image processing, which differs for each divided area, is selected, the image processing for the selected deformation-corrected image is executed, and the blurriness of the corrected image is subjected to processing, will be explained.

First, a configuration having an image processing device according to the second embodiment will be explained by referring to FIG. 11.

Figure 11:
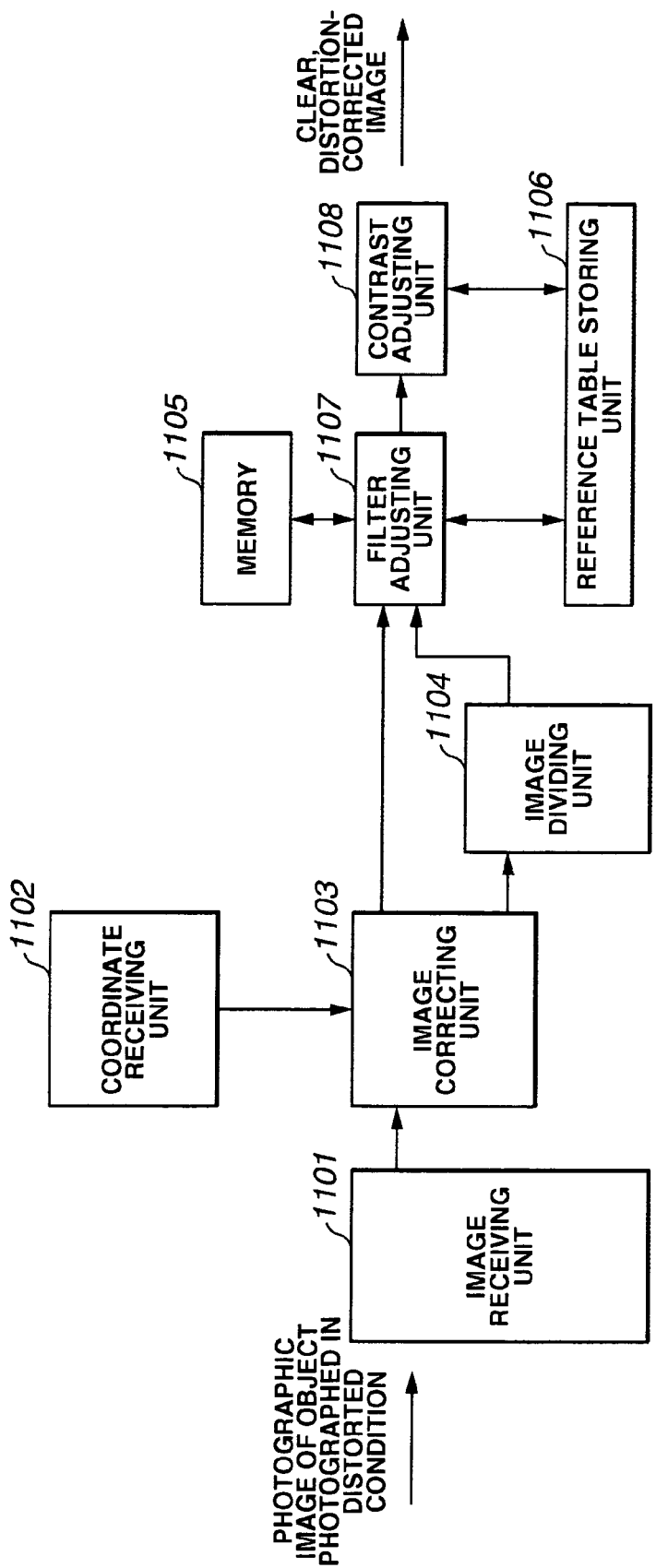
FIG. 11 is a block diagram showing a configuration having an image processing device according to another embodiment of the present invention.

FIG. 11 is a block diagram showing a configuration having an image processing device according to the second embodiment.

An image processing device according to the second embodiment has an image receiving unit 1101; a coordinate receiving unit 1102; an image correcting unit 1103; an image dividing unit 1104; a memory 1105; a reference table storing unit 1106; a filter adjusting unit 1107; and a contrast adjusting unit 1108.

The image receiving unit 1101 receives a photographic image, in which an object has been photographed in a distorted condition, and sends the received photographic image to the image correcting unit 1103.

As for the coordinate receiving unit 1102, the coordinates of the four corners of a square, which has been photographed in a distorted condition inside a photographic image received by the image receiving unit 1101, are inputted by a user.

The image correcting unit 1103 performs processing for correcting the deformation of a square photographed in a distorted condition inside a photographic image, which has the photographic image sent from the image receiving unit 1101, and which was inputted via the coordinate receiving unit 1102, and performs processing for obtaining an image, which was modified from the photographic image.

Now then, the image correcting unit 1103 sends information related to the travel distance, which pixel data inside the photographic image moved when the photographic image was corrected, and the deformation-corrected image to the image dividing unit 1104, and sends the deformation-corrected image to the filter adjusting unit 1107.

The image dividing unit 1104, upon receiving information related to the travel distance of the pixel data, and the corrected image from the image correcting unit 1103, divides the corrected image into plural areas in accordance with the travel distance of the pixel data, and sends information on the areas, into which the corrected image has been divided, to the filter adjusting unit 1107.

The memory 1105 stores spatial filters, which are used when the filter adjusting unit 1107 adjusts image quality, and the memory 1105 is utilized when image quality is adjusted.

The reference table storing unit 1106 stores a filter symbol reference table, which records the numbers of spatial filters selected in accordance with the travel distance of pixels, and a LUT number reference table, which records the number of a LUT selected in accordance with the travel distance of the pixels.

Then, when the filter adjusting unit 1107 and contrast adjusting unit 1108 carry out image processing, they perform their respective image processing by selecting a spatial filter and a LUT with which to carry out image processing from the information stored in the reference table storing unit 1106.

The filter adjusting unit 1107, based on information of an area in which a corrected image has been divided into plural areas, selects, in accordance with the travel distance of the pixel data determined for each area, a type of spatial filter by referring to a filter symbol reference table 1200, which is stored in the reference table storing unit 1106, and uses the selected spatial filter to carry out image quality adjustment for each divided area of the corrected image sent from the image correcting unit 1103.

Furthermore, the number of types of spatial filters, which are referenced from the filter symbol reference table 1200, and utilized by the filter adjusting unit 1107, are the same as the spatial filters explained in the first embodiment by referring to FIG. 3, and spatial filters having a different number of filter system, as well as spatial filters having different filter sizes are used.

An image, for which image quality adjustment has been performed by the filter adjusting unit 1107 using a spatial filter, and information on the areas into which the corrected image, which the filter adjusting unit 1107 received from the image dividing unit 1104, have been divided, are sent from the filter adjusting unit 1107 to the contrast adjusting unit 1108.

The contrast adjusting unit 1108 performs contrast adjustment of the image sent from the filter adjusting unit 1107 by selecting, on the basis of the divided area information sent from the same filter adjusting unit 1107, a LUT for carrying out contrast adjustment from a LUT number reference table 1201, which is stored in the reference table storing unit 1106, and using the selected LUT to perform contrast adjustment.

Furthermore, the number of types of LUTs, which are referenced from the LUT number reference table 1201, and used in the contrast adjusting unit 1108, are the same as the LUTs explained in the first embodiment by referring to FIG. 5, and a number of types of tables, for which the contents of the LUTs differ, are used.

A deformation-corrected image of a photographic image, in which an object has been distorted due to the photographic position received by the image receiving unit 1101, is prepared by the image correcting unit 1103, and the corrected image is divided by the image dividing unit 1104 into plural areas in accordance with the travel distance, which the pixel data traveled when the photographic image was corrected, and information concerning the divided areas is generated.

Then, image processing is carried out by the filter adjusting unit 1107 by selecting spatial filters, which differ for each area into which the corrected image has been divided, and contrast adjustment is performed by the contrast adjusting unit 1108 by selecting LUTs, which differ for each area into which the corrected image has been divided, producing a clear image in which the deformation of the object brought on due to the photographic position has been corrected.

Next, the filter symbol reference table 1200, which is stored in the reference table storing unit 1106, and referenced when selecting a spatial filter, and the LUT number reference table 1201, which is stored in the reference table storing unit 1106, and referenced when selecting a LUT, will be explained by referring to FIGS. 12A and 12B.

FIG. 12A and FIG. 12B are tables showing a filter symbol reference table 1200 and LUT number reference table 1201, which are stored in a reference table storage unit 1106.

FIG. 12A is a table showing a filter symbol reference table 1200 stored in a reference table storage unit 1106, and FIG. 12B is a table showing a LUT number reference table 1201 stored in a reference table storage unit 1106.

As shown in FIG. 12A, spatial filter symbols are recorded in the filter symbol reference table 1200 in accordance with travel distance Dn so that the selection of a spatial filter for adjusting image quality is carried out in accordance with plural areas into which a corrected image is divided when image quality adjustment is carried out by the filter adjusting unit 1107, and a spatial filter corresponding to the travel distance Dn of the pixel data is selected.

For example, when the travel distance of pixel data in one of the divided areas is equal to or greater than 4.0 but less than 8.0, the spatial filter of symbol B is selected for this area, and image quality adjustment is carried out.

Further, as shown in FIG. 12B, LUT numbers are recorded in the LUT number reference table 1201 in accordance with the travel distance Dn so that the LUT number to be used when contrast adjustment is performed by the contrast adjusting unit 1108 for an image, which has been subjected to image quality adjustment by the filter adjusting unit 1107, is selected in accordance with the pixel data travel distance Dn determined for the plurality of areas into which a corrected image was divided.

For example, when the travel distance Dn of pixel data of one of the divided areas is greater that 4.0 but less than 8.0, the LUT of the number 2 is selected for this area, and image quality adjustment is carried out.

Next, an area, in which a corrected image has been divided into plurality of areas in the image dividing unit 1105 on the basis of the travel distance of pixel data when the deformation of a photographic image is corrected will be explained by referring to FIG. 13.

Figure 13:
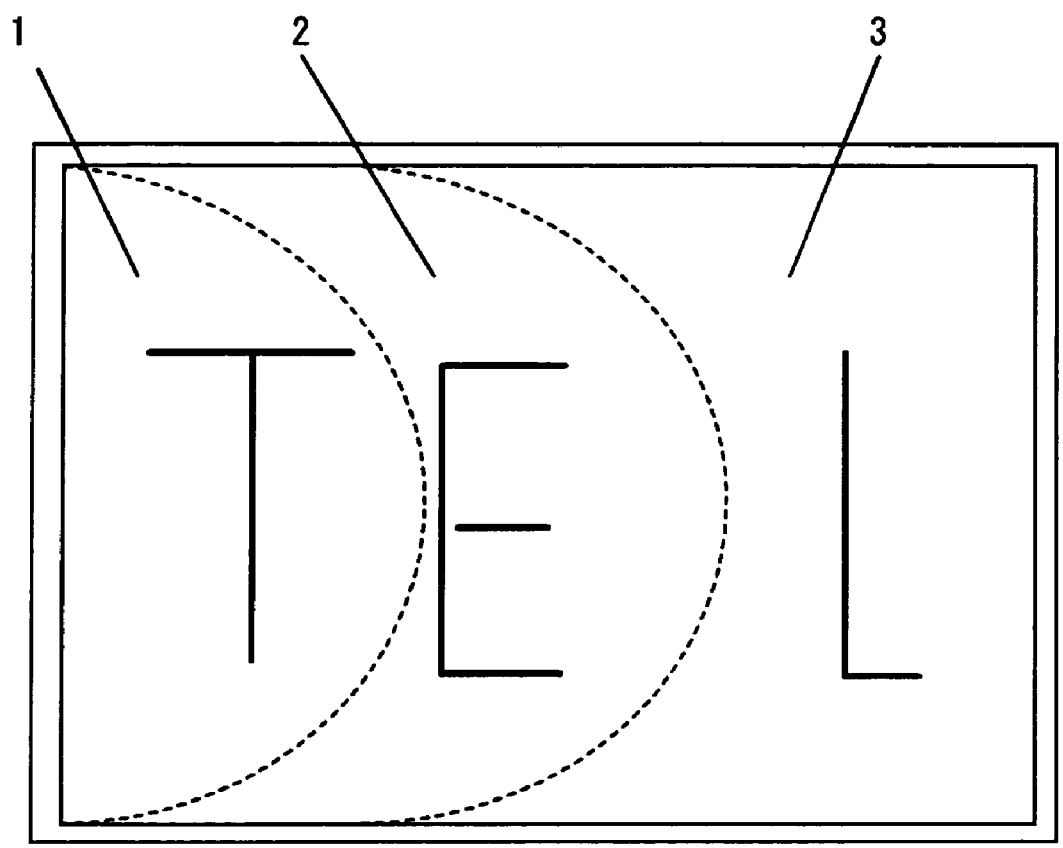
FIG. 13 is a conceptual diagram showing information of an area, in which a corrected image has been divided into plural areas in an image dividing unit 1105 on the basis of the travel distance of pixel data when the deformation of a photographic image is corrected.

FIG. 13 is a conceptual diagram showing information of an area, in which a corrected image has been divided into plural areas in an image dividing unit 1105 on the basis of the travel distance of pixel data when the deformation of a photographic image is corrected.

As shown in FIG. 13, a deformation-corrected image is divided into three areas in accordance with the travel distance, which pixel data is moved, and in one of the areas, the travel distance Dn is less than 4.0, in another area, Dn is equal to or greater than 4.0 but less than 8.0, and in another area, Dn is equal to or greater than 8.0.

Thus, since the corrected image is divided into plural areas in accordance with the travel distance of the pixels, by subjecting the divided image to image quality adjustment, which is selected on the basis of the travel distance by referring to the filter symbol reference table 1200 and the LUT number reference table 1201, image quality adjustment, which differs by area in accordance with the pixel travel distance, is also carried out for an image with a high enlargement ratio for correcting a deformation, and a large pixel travel distance, and image quality adjustment is carried out relative to the blurriness of a corrected image.

Next, the flow of processing for correcting a photographic image received by the image receiving unit 1101, and for adjusting the image quality of the corrected photographic image using the filter adjusting unit 1107 and contrast adjusting unit 1108 will be explained by referring to FIG. 14.

Figure 14:
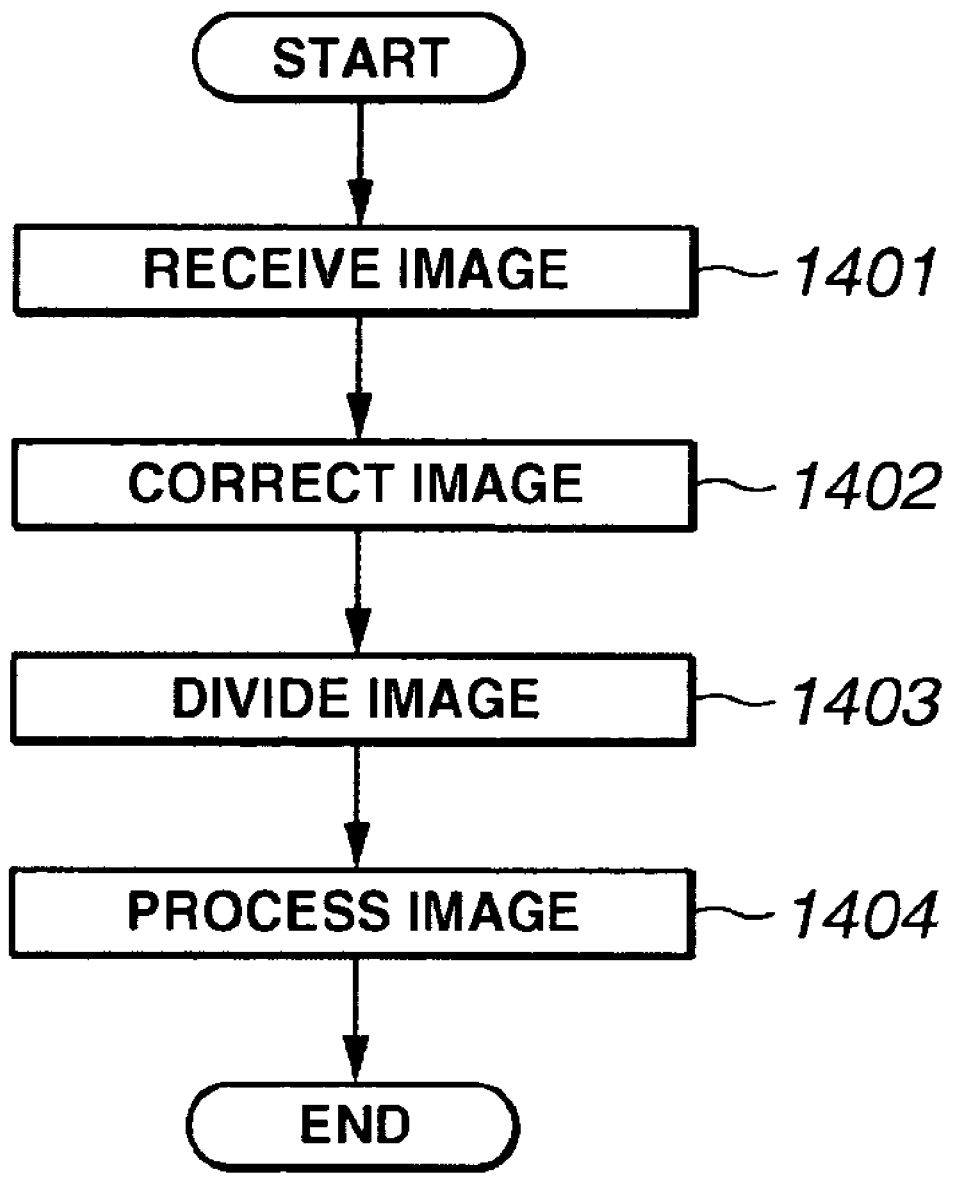
FIG. 14 is a flowchart showing the flow of processing for correcting a photographic image received by the image receiving unit 1101, and adjusting the image quality of the corrected photographic image via a filter adjusting unit 1107 and contrast adjusting unit 1108.

FIG. 14 is a flowchart showing the flow of processing for correcting a photographic image received by the image receiving unit 1101, and adjusting the image quality of the corrected photographic image using the filter adjusting unit 1107 and contrast adjusting unit 1108.

As depicted in the flowchart shown in FIG. 14, when a photographic image in which an object has been photographed in a distorted condition is received by the image receiving unit 1101 of the image processing device (Step 1401), the coordinates of the four corners of the photographic image inside the received image are inputted from the coordinate receiving unit 1102 by a user clicking a mouse button or performing some other such operation, and processing for correcting the deformation of the photographic image is carried out by the image correcting unit 1103 (Step 1402).

Then, on the basis of information related to the distance pixels were moved, and the corrected image, which were sent from the image correcting unit 1103, the deformation-corrected image is divided into plural areas by the image dividing unit 1104 in accordance with the travel distance of the pixels (Step 1403).

When the corrected image is divided into plural areas, a spatial filter, which is used when image quality is adjusted by the filter adjusting unit 1107, is selected from the filter symbol reference table 1200 for each divided area on the basis of the travel distance of the pixels of the divided areas, and image quality adjustment is performed by a selected spatial filter for each area into which the adjusted image has been divided, and, in addition, a LUT, which is used for contrast adjustment, is selected from the LUT number reference table 1201 for each divided area, and contrast adjustment is performed by the contrast adjusting unit 1108 using the selected LUT for each divided area of the image, which has been adjusted by the filter adjusting unit 1107, producing a deformation-corrected image without blurriness (Step 1404).

Furthermore, information on the areas into which the photographic image has been divided by the image dividing unit 1104 in accordance with the travel distance of the pixel data, and the image, which was subjected to image quality adjustment by the filter adjusting unit 1107, are sent to the contrast adjusting unit 1108 from the filter adjusting unit 1107.

Furthermore, in this embodiment, when a photographic image is corrected by the image correcting unit 1103, as explained in the first embodiment, correction of a deformation is not only carried out in the X-axis direction, which is one of the axial directions representing the image data, but rather correction of a deformation is also carried out in along the other axis, the Y-axis direction.

Furthermore, in the first embodiment, as explained by referring to FIG. 9, an image processing device according to the first embodiment can be incorporated into a personal computer, making it possible to use an image, which was photographed by a camera-equipped mobile telephone or a digital camera, in a variety of applications. In the second embodiment as well, the same as in the first embodiment, an image processing device according to the second embodiment can be incorporated into a personal computer, enabling an image, which was photographed by a camera-equipped mobile telephone or a digital camera, to be used in various applications.

Further, in the first embodiment, as explained by referring to FIG. 10, it is possible to utilize an image processing device according to the first embodiment such that deformations of images of a manuscript and whiteboard inside a conference room, which were photographed using a zoom-equipped camera mounted in the ceiling of the conference room, are corrected, and the contents written on the manuscript and whiteboard inside the conference room are digitized. In the second embodiment as well, the same as in the first embodiment, an image processing device according to the second embodiment can be utilized such that deformations of images of a manuscript and whiteboard inside a conference room, which were photographed using a zoom-equipped camera mounted in the ceiling of the conference room, are corrected, and the contents written on the manuscript and whiteboard inside the conference room are digitized.

According to the present invention, since the constitution is such that a photographic image, in which a deformation has occurred due to the photographic position of the object, is inputted by an inputting unit, the deformation of this inputted photographic image is corrected by an image correcting unit, and image processing, which differs respectively in accordance with the correction value by the above-mentioned image correcting unit, is performed for a corrected image, which was corrected by this image correcting unit, the effect is that optimal image processing corresponding to the correction value of the photographic image becomes possible, thereby enabling the acquisition of a corrected image with little image blurriness.

The present invention can be utilized in an image processing device, which corrects the deformation of a photographic image of an object to be photographed caused by the photographic position of the object.

According to the present invention, the blurriness of an image can be reduced by performing image processings, which differs respectively in accordance with the correction value for correcting the deformation of a photographic image.

As described above, according to an aspect of the present invention, an image processing device for correcting a deformation of a photographic image of an object to be photographed, the deformation resulting from a photographic position of the object, comprises an inputting unit that inputs the photographic image; an image correcting unit that corrects a deformation of the photographic image inputted by the inputting to produce a corrected image; and an image processing unit that performs different image processings that are different from each other for the corrected image corrected by the image correcting unit, the different image processings being performed in different manners in accordance with correction amount by the image correcting unit.

According to another aspect of the present invention, the image correcting unit comprises a magnification determining unit that respectively determines magnifications in prescribed directions of image data corresponding to the photographic image; and a magnification processing unit that performs magnification processing of the image data in the prescribed directions using the magnifications determined by the magnification determining unit, wherein the image processing unit performs respectively different image processings for the image data that has been subjected to the magnification processing performed by the magnification processing unit in accordance with the magnifications of the magnification processing.

According to still another aspect of the present invention, the object to be photographed is a square, and the magnification determining unit comprises a scanning unit that sequentially scans the image data parallelly along a prescribed side of the square of the image data; an inputting unit that inputs coordinates of vertexes of a square of the object before the correction; and a determining unit that determines vertexes of the square after the correction from the coordinates of the vertexes inputted by the inputting unit, and determines the magnifications for each scan line.

According to yet another aspect of the present invention, the image processing unit performs the different image processings by digital filtering processes with different filter coefficients.

According to even another aspect of the present invention, the image processing unit performs the different image processings by digital filtering processes with different filter sizes.

According to further aspect of the present invention, the image processing unit performs the different image processings by contrast processes with different look-up tables.

According to still further aspect of the present invention, an image processing method for correcting a deformation in a photographic image of an object to be photographed, resulting from a photographic position of the object, comprises inputting the photographic image by an inputting unit; correcting, by an image correcting unit, a deformation of the photographic image inputted by the inputting unit to produce a corrected image; and performing, by an image processing unit, image processings, which differs from each other in accordance with a correction amount by the image correcting unit, for the corrected image which is corrected by the image correcting unit.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-194921 filed on Jul. 4, 2005 including specification, claims, drawings and abstract is incorporated herein by reference in its entirety.

What is claimed is:

1. An image processing device for correcting a deformation of a deformed photographic image of an object photographed by a camera, the deformation resulting from a photographic position of the object with respect to the camera, the device comprising:

an inputting unit that inputs the deformed photographic image;

an image correcting unit that corrects the deformation of the deformed photographic image to produce a corrected image; and an image processing unit that performs different image processing operations that are different from each other for the corrected image, the different image processing operations being performed in different manners in accordance with an amount of correction the image correcting unit makes to the deformed photographic image, wherein the deformation results from different angles of incidence of light, from different points of the object, onto the camera.

2. The image processing device according to claim 1, wherein the image correcting unit comprises:

a magnification determining unit that respectively determines magnifications in prescribed directions of image data corresponding to the photographic image; and a magnification processing unit that performs magnification processing of the image data in the prescribed directions using the magnifications determined by the magnification determining unit, wherein the image processing unit performs respectively different image processing operations for the image data that has been subjected to the magnification processing performed by the magnification processing unit in accordance with the magnifications of the magnification processing.

3. The image processing device according to claim 2, wherein the object to be photographed is a square, and the magnification determining unit comprises:

a scanning unit that sequentially scans the image data along lines parallel to a prescribed side of the square of the image data;

an inputting unit that inputs coordinates of vertexes of a square of the object before the correction; and a determining unit that determines vertexes of the square after the correction from the coordinates of the vertexes inputted by the inputting unit, and determines the magnifications for each scan line.

4. The image processing device according to claim 1, wherein the image processing unit performs the different image processing operations by digital filtering processes with different filter coefficients.

5. The image processing device according to claim 1, wherein the image processing unit performs the different image processing operations by digital filtering processes with different filter sizes.

6. The image processing device according to claim 1, wherein the image processing unit performs the different image processing operations by contrast processes with different look-up tables.

7. An image processing method for correcting a deformation in a deformed photographic image of an object photographed by a camera, resulting from a photographic position of the object with respect to the camera, the method comprising:

inputting the deformed photographic image by an inputting unit;

correcting, by an image correcting unit, the deformation of the deformed photographic image to produce a corrected image; and performing, by an image processing unit, image processing operations, which differs from each other in accordance with an amount of correction the image correcting unit makes to the deformed photographic image, for the corrected image wherein the deformation results from different angles of incidence of light, from different points of the object, onto the camera.

8. The method of claim 7, wherein the different angles of incidence result from a non-zero angle between the camera and a surface of the object.

9. The method of claim 7, wherein the photographic image is of a rectangle, and wherein the deformed photographic image is a trapezoid.

10. The method of claim 9, wherein the inputting the deformed photographic image includes:

receiving coordinates of four corners of the trapezoid;

setting one of the four corners as an origin of a coordinate system having a first axis and a second axis perpendicular to the first axis;

setting a first line through the origin and parallel to two parallel sides of the trapezoid as the first axis;

setting a second line through the origin as the second axis;

determining coordinates of the four corners of the trapezoid as a first coordinate $(0,0)$, a second coordinate $(0,xt)$, a third coordinate $(xa,yt)$ and a fourth coordinate $(xb,yt)$, where $xt$ is longest of the coordinates along the first axis and $yt$ is longest of the coordinates along the second axis; and deducing from the coordinates of the four corners of the trapezoid, rectangle coordinates of four corners of the rectangle as $(0,0)$, $(xt,0)$, $(0,yt)$, and $(xt,yt)$ by treating the first coordinate $(0,0)$ and a point $(xt,yt)$ as corners of the rectangle.

11. The method of claim 10, wherein the correcting of the deformation of the rectangle includes:

modifying a width $Bn$ of the trapezoid at $yn$ to arrive at a rectangle width $Wn$ parallel to the first axis at $yn$, the width $Bn$ of the trapezoid being a width parallel to the first axis at the distance $yn$ from the origin, $0 \leqq yn \leqq yt$, by determining a correction factor $Ln$ from a relationship as follows:

$Wn=Bn*Ln$, where:

$Ln=xt/Bn$, $Bn=xt-An-Cn$, $An=xa*yn/yt$, and $Cn=(xt-xb)*yn/yt$, and wherein the amount of correction is a function of the correction factor $Ln$.

12. The method of claim 11, wherein the performing of the image processing includes:

applying a filter to the corrected image; and varying a filter type of the filter according to the correction factor $Ln$.

* * * * *